United States Patent
Van Mechelen et al.

(10) Patent No.: US 11,543,237 B2
(45) Date of Patent: Jan. 3, 2023

(54) METHOD FOR INSPECTION OF A TARGET OBJECT, CONTROL SYSTEM AND INSPECTION SYSTEM

(71) Applicant: ABB Schweiz AG, Baden (CH)

(72) Inventors: Jacobus Lodevicus Martinus Van Mechelen, Regensdorf (CH); Deran Maas, Zürich (CH); Andreas Frank, Zürich (CH)

(73) Assignee: ABB Schweiz AG, Baden (CH)

( * ) Notice: Subject to any disclaimer, the term of this patent is extended or adjusted under 35 U.S.C. 154(b) by 11 days.

(21) Appl. No.: 17/269,421

(22) PCT Filed: Aug. 23, 2018

(86) PCT No.: PCT/EP2018/072709
§ 371 (c)(1),
(2) Date: Feb. 18, 2021

(87) PCT Pub. No.: WO2020/038573
PCT Pub. Date: Feb. 27, 2020

(65) Prior Publication Data
US 2021/0190478 A1    Jun. 24, 2021

(51) Int. Cl.
*G01B 11/06*       (2006.01)
*G01N 21/3581*    (2014.01)
(Continued)

(52) U.S. Cl.
CPC ..... *G01B 11/0633* (2013.01); *G01N 21/3581* (2013.01); *G01N 21/55* (2013.01); *G01N 21/84* (2013.01); *G01N 2021/8427* (2013.01)

(58) Field of Classification Search
CPC .. G01B 11/0633; G01B 11/255; G01B 15/02; G01N 21/3581; G01N 21/55; G01N 21/84; G01N 2021/8427; G01N 21/8422
See application file for complete search history.

(56) References Cited

U.S. PATENT DOCUMENTS

| | | |
|---|---|---|
| 2003/0011784 A1 | 1/2003 | De Groot et al. |
| 2006/0187444 A1* | 8/2006 | Tsuchimichi ...... G01N 21/9081 356/237.1 |
| 2012/0236318 A1 | 9/2012 | Aoki |

FOREIGN PATENT DOCUMENTS

| | | |
|---|---|---|
| DE | 102011104708 A1 | 12/2012 |
| DE | 102016012396 A1 | 4/2018 |

(Continued)

OTHER PUBLICATIONS

International Preliminary Report of Patentability; Application No. PCT/EP2018/072709; dated Jan. 14, 2021; 71 Pages.
(Continued)

*Primary Examiner* — David P Porta
*Assistant Examiner* — Gisselle M Gutierrez
(74) *Attorney, Agent, or Firm* — Whitmyer IP Group LLC

(57) ABSTRACT

A method for inspection of a target object, the method including irradiating a reference surface having a non-flat reference profile with radiation; determining reference response data based on detected radiation having interacted with the reference surface; irradiating a target object with radiation, the target object including a target surface having a non-flat target profile corresponding to the reference profile; determining inspection response data based on detected radiation having interacted with the target object; and determining at least one parameter of the target object based on the reference response data and the inspection response data. An alternative method; a control system for controlling an emitter system and a detector system; and an inspection system including a control system, an emitter system and a detector system, are also provided.

20 Claims, 5 Drawing Sheets

(51) Int. Cl.
*G01N 21/55* (2014.01)
*G01N 21/84* (2006.01)

(56) References Cited

FOREIGN PATENT DOCUMENTS

| | | | |
|---|---|---|---|
| EP | 1688704 | A1 | 8/2006 |
| EP | 1714141 | B1 | 3/2011 |

OTHER PUBLICATIONS

International Search Report and Written Opinion of the International Searching Authority; PCT/EP2018/072709 Completed: Jan. 11, 2019; dated Jan. 25, 2019; 16 Pages.

* cited by examiner

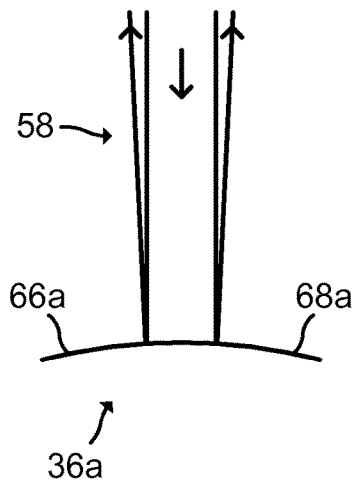
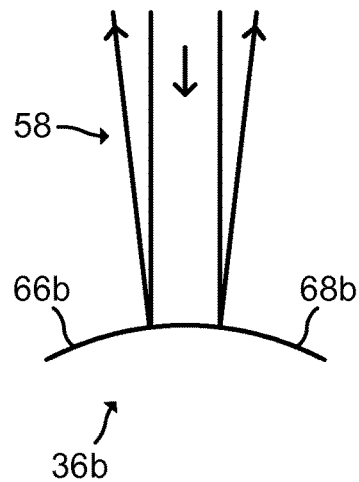
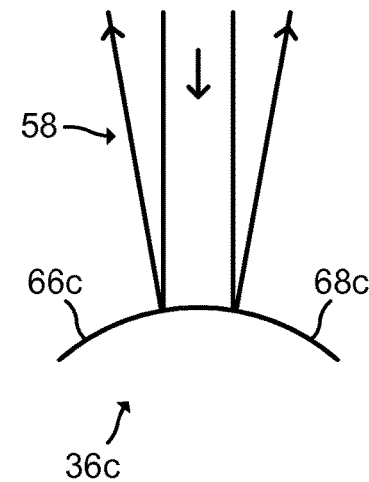
Fig. 3a  Fig. 3b  Fig. 3c
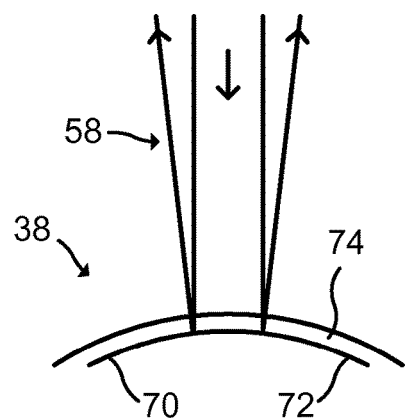
Fig. 4

METHOD FOR INSPECTION OF A TARGET OBJECT, CONTROL SYSTEM AND INSPECTION SYSTEM

TECHNICAL FIELD

The present disclosure generally relates to inspection of target objects by means of radiation. In particular, a method for inspection of a target object having a non-flat target profile by means of radiation, a control system for controlling an emitter system and a detector system, and an inspection system, are provided.

BACKGROUND

Optical spectroscopy, such as THz (terahertz) spectroscopy, may be used to perform non-contact and non-destructive inspection of material properties based on interaction between matter and electromagnetic radiation. Examples of potential areas of application are paint layer inspection in the automotive and aerospace industries, bumper and sheet inspection in the plastic industry, and other kinds of quality control of surfaces and thin layers, for example within the medical and agricultural fields.

One problem of using such an optical technology on objects that are curved, such as car bodies, fuselages and bumpers, is that the curvature affects the divergence of the radiation beam used for the quality control. Consequently, instead of being entirely detected, a part of the radiation will not reach the radiation detector. A direct consequence of this is that the determined quality control parameters will have significant error bars, or in the worst case will be undeterminable.

In quality control of material properties and thicknesses of individual paint layers, an absolute measurement may be used, i.e., a measurement where absolute functions are determined. In order to perform such a measurement, both an inspection measurement on a target object, as well as a reference measurement on a reference object, are required. For reflection measurements, it is previously known to use a flat reflecting plate, such as a mirror, as a reference object, reflecting close to 100% of the radiation. For transmission measurements, this object may be an aperture that transmits the entire radiation beam to the radiation detector.

DE 102011104708 A1 discloses a device and a method for determining material properties of a coated or uncoated substrate sample in the electromagnetic terahertz frequency spectrum, in particular a substrate sample which is coated with at least one layer and which is preferably reinforced with fibers. The substrate sample is illuminated with at least two terahertz light pulses of different polarizations, in particular with the same beam cross-section, the light pulses propagating in a collinear manner and being generated by at least two terahertz emitters. The terahertz light pulses that are reflected by the substrate sample and/or transmitted through the substrate sample are measured with respect to the intensity and/or electric field strength in at least two, preferably three different polarization directions in a time-resolved manner.

EP 1688704 A1 discloses a thin film inspection method for determining the state of a thin film formed on the surface of an object. The method comprises radiating measurement light from a radiator with nothing set on a thin film inspection apparatus. An intensity spectrum output from a light splitter is stored as a dark reference in an arithmetic unit. Next, measurement light is radiated from the radiator in a state where a reference PET bottle having the same shape as the object and formed with no barrier film thereon is set on the thin film inspection apparatus. The arithmetic unit then stores an intensity spectrum output from the light splitter as a reference spectrum. Next, measurement light is radiated from the radiator with the object PET bottle set on the thin film inspection apparatus. The arithmetic unit then acquires the intensity spectrum output from the light splitter as a measurement spectrum. Furthermore, the arithmetic unit calculates a relative reflectivity from an equation using the measurement spectrum, the dark reference and the reference spectrum in store.

US 2012236318 A1 discloses a defect inspection process of an object. The process comprises profile measuring processing to obtain profile data of an object surface, and calculation of an evaluating value indicating a correlation degree of the profile data and non-defective profile data. The non-defective profile data corresponds to non-defective product data of the profile data, and is profile data obtained in a state where a non-defective product with the same specification as that of the object, instead of the object, is placed on a stage.

DE 102016012396 A1 discloses a method for improving defect detectability in a direct imaging test with non-ionizing electromagnetic waves, where a difference of a current image is formed to an image of a reference object.

US 2003011784 A1 discloses an interferometry method. The method comprises directing a measurement wavefront to reflect from a measurement surface and a reference wavefront to reflect from a reference surface, where the measurement and reference wavefronts are from a common light source, and directing the reflected measurement and reference wavefronts to overlap with one another and form an interference pattern.

SUMMARY

One object of the present disclosure is to provide a method for inspection of a target object, which method provides a more accurate determination of at least one parameter of the target object.

A further object of the present disclosure is to provide a method for inspection of a target object, which method provides a faster determination of at least one parameter of the target object.

A still further object of the present disclosure is to provide a method for inspection of a target object, which method provides a simpler determination of at least one parameter of the target object.

A still further object of the present disclosure is to provide a method for inspection of a target object, which method improves quality control of the target object.

A still further object of the present disclosure is to provide a method for inspection of a target object, which method solves several or all of the foregoing objects.

A still further object of the present disclosure is to provide a control system for controlling an emitter system and a detector system, which control system solves one, several or all of the foregoing objects.

A still further object of the present disclosure is to provide an inspection system, which inspection system solves one, several or all of the foregoing objects.

According to one aspect, there is provided a method for inspection of a target object, the method comprising irradiating a reference surface having a non-flat reference profile with radiation; determining reference response data based on detected radiation having interacted with the reference surface; irradiating a target object with radiation, the target object comprising a target surface having a non-flat target profile corresponding to the reference profile; determining inspection response data based on detected radiation having interacted with the target object; and determining at least one parameter of the target object based on the reference response data and the inspection response data.

By determining the at least one parameter of the target object based on both reference response data from radiation having interacted with the reference surface and inspection response data from radiation having interacted with the target surface, where the non-flat reference profile of the reference surface corresponds to the non-flat target profile of the target surface, the at least one parameter of the target object can be more accurately determined for non-flat target profiles. This provides for an improved quality control of a non-flat target object by means of a non-contact optical inspection.

The irradiation of the reference surface, the detection of the radiation from the reference surface, and the determination of reference response data based on the detected radiation, may be referred to as a reference measurement. The reference response data may be represented in the time-domain and/or in the frequency-domain. The reference response data may for example be constituted by, or comprise, a reference response waveform (in time-domain), a reference response spectrum (in frequency-domain), and/or some other data describing the detected radiation having interacted (e.g., by reflection or transmission) with the reference surface.

The irradiation of the target object, and the determination of inspection response data based on detected radiation having interacted with the target object, may be referred to as an inspection measurement. The inspection response data may be represented in the time-domain and/or in the frequency-domain. The inspection response data may for example be constituted by, or comprise, an inspection response waveform (in time-domain), an inspection response spectrum (in frequency-domain), and/or some other data describing the detected radiation having interacted (e.g., by reflection or transmission) with the target object.

For example, instead of using a plane-parallel reference object for a reference measurement and then carrying out an inspection measurement on a curved target object, the method according to the present disclosure provides for the use of a reference surface, with a similar curvature as the target surface, for the reference measurement prior to the inspection measurement of the target object. The reference measurement is thereby used to more accurately represent the inspection measurement. By performing such reference measurement on a reference surface having the same or comparable curvature as the target object, the accuracy of the determination of the at least one parameter of the target object, such as material properties and thickness(es) of a coating on the target surface, can be strongly enhanced.

The reference profile and/or the target profile, such as curvatures thereof, may be previously known, or may be defined by means of a profile sensor.

One example of such profile sensor is described in European patent application EP 2899499 A1.

Throughout the present disclosure, two corresponding profiles need not necessarily be perfectly corresponding to each other. Two corresponding profiles may be constituted by identical profiles or comparable profiles. For example, in case the two profiles each comprises a curve (e.g., a spherical or cylindrical profile), the two profiles may be said to be corresponding if the radii of curvature differ less than 10%, such as less than 5%, such as less than 2%, such as less than 1%. The same applies for profiles having different curvatures in two directions. Throughout the present disclosure, a non-flat profile may comprise a radius of curvature of less than 30 m, such as less than 20 m.

The determination of at least one parameter of the target object based on the reference response data and the inspection response data may for example be made by means of an algorithm for fitting predicted inspection response data to the determined inspection response data. One example of such algorithm is described in European patent application EP 2899498 A1.

The algorithm may be based on a physical model, i.e., a function outputting predicted inspection response data based on model parameters as input variables and the determined reference response data. Examples of further input variables to the physical model include measured temperature and moisture. The physical model is based on physical considerations, such as various optical properties of the target object (and of one or several potential coating layers thereon), physical laws describing the interaction between the radiation and the target object, the configuration of the target object as compared to the radiation, and the geometry of the target object.

Target objects according to the present disclosure may be constituted by a wide range of objects having one or more non-flat target profiles, including for example car bodies, car bumpers, aircraft fuselages, or parts thereof. The method according to the present disclosure may for example be used for industrial quality control, such as paint quality control in the automotive industry.

As used herein, a reference profile and a target profile each refers to a local curvature on a reference surface and a target surface, respectively. A reference surface and a target surface may each comprise one or several reference profiles and target profiles, respectively.

The method may further comprise irradiating a plurality of non-flat reference profiles of one or more reference surfaces with radiation; and for each reference profile, determining reference response data associated with the reference profile, based on detected radiation having interacted with the reference surface. This variant may comprise a scanning along a reference surface comprising a plurality of different reference profiles, such as different curvatures, and determining reference response data associated with each reference profile. The method may further comprise determining the non-flat reference profiles, for example by means of a profile sensor.

According to one example, a robot-mounted THz sensor first scans across a metallic mold that may have hundreds of reference profiles that represent the target profiles (e.g., curves) of a car body, and then inspects one or several car bodies. By compensating for the influence of curvature of the car bodies, the accuracy of the determination of the at least one parameter, such as a paint layer thickness, is significantly improved.

Alternatively, or in addition, the method may further comprise sequentially adjusting a reference profile of a reference surface into a plurality of reference profiles; irradiating the reference surface with radiation when the reference surface has adopted each reference profile; and for each reference profile adopted by the reference surface, determining reference response data associated with the reference profile, based on detected radiation having interacted with the reference surface. In this way, reference measurements on many different reference surfaces can be avoided.

The method may further comprise determining the target profile of the target surface; and selecting the reference profile most comparable to the target profile; wherein the determination of at least one parameter of the target object is made based on the reference response data associated with the selected reference profile and the inspection response data. The target profile may for example be determined by means of a profile sensor.

The reference profile may comprise a curvature with a radius of 0.01 m to 20 m, such as 0.1 m to 7 m, such as 0.5 m to 5 m. The same applies for the target profile.

The reference surface may be constituted by the target surface. For example, the reference surface may be constituted by a surface of a car body prior to painting, such as with a zinc layer or e-coat layer on top. In this case, the reference measurement may be carried out on the surface prior to painting, and the inspection measurement may be carried out on the surface after painting.

The method as described above may be regarded as a first variant. In the first variant, the reference measurement may be made in focus or out of focus. According to an alternative variant, there is provided a method for inspection of a target object, the method comprising irradiating a reference surface having a reference profile with radiation; detecting radiation having interacted with the reference surface, wherein the irradiation and/or the detection of the radiation is made out of focus; determining reference response data associated with a non-flat theoretical reference profile, based on the detected radiation; irradiating a target object with radiation, the target object comprising a target surface having a non-flat target profile corresponding to the theoretical reference profile; determining inspection response data based on detected radiation having interacted with the target object; and determining at least one parameter of the target object based on the reference response data and the inspection response data. The theoretical reference profile may thus correspond to a (physical) reference profile of a (physical) reference surface measured out of focus.

The method according to this variant provides for an alternative way of more accurately determining the at least one parameter of a non-flat target profile of a target object. For example, by performing a reference measurement out of focus on a reference surface having a flat reference profile, the same effect as performing a reference measurement in focus on a spherical reference surface having a spherical reference profile can be obtained. In this way, reference measurements on many different reference surfaces can be dispensed with. The method according to this variant may also comprise a reference measurement out of focus on a reference surface having a non-flat reference profile. Throughout the present disclosure, the inspection measurement on a target object may be made either in focus or out of focus.

The theoretical reference profile may comprise a curvature with a radius of 0.01 m to 20 m, such as 0.1 m to 7 m, such as 0.5 m to 5 m.

The reference surface may be provided on a reference object (e.g., when the reference surface is not constituted by the target surface). In this case, the surface properties of the reference surface and the target surface may be substantially identical. For example, the reference surface may be subjected to the same or a similar surface treatment as the target object, prior to the reference measurement, to make the reference surface similarly rough (or similarly smooth) as the target surface.

The target object may comprise at least one coating on the target surface; and the determination of at least one parameter of the target object may comprise determining at least one parameter of the at least one coating. The determination of at least one parameter of the at least one coating may comprise determining a thickness of the at least one coating and/or optical properties of the at least one coating.

Throughout the present disclosure, the radiation may be electromagnetic radiation with a frequency of 0.01 THz to 10 THz, such as 0.1 THz to 3 THz.

The methods according to the above two variants may be collectively defined as a method for inspection of a target object, the method comprising irradiating a reference surface with radiation; determining reference response data based on detected radiation having interacted with the reference surface, wherein the reference response data corresponds to detected radiation having interacted with the reference surface of a non-flat reference profile; irradiating a target object with radiation, the target object comprising a target surface having a non-flat target profile corresponding to the non-flat reference profile; determining inspection response data based on detected radiation having interacted with the target object; and determining at least one parameter of the target object based on the reference response data and the inspection response data.

According to a further aspect, there is provided a control system for controlling an emitter system and a detector system, the control system comprising a data processing device and a memory having a computer program stored thereon, the computer program comprising program code which, when executed by the data processing device, causes the data processing device to perform the steps of controlling the emitter system to emit radiation according to the present disclosure; controlling the detector system to detect radiation according to the present disclosure; and determining reference response data, inspection response data and at least one parameter of a target object according to the present disclosure. The data processing device may be constituted by one or several data processing units. In case the data processing device is constituted by several data processing units, these units may or may not be physically separated. Each data processing unit may be assigned to one or more of the above steps. Correspondingly, the memory may be constituted by one or several (e.g., physically separated) memory units.

According to a further aspect, there is provided an inspection system comprising a control system according to the present disclosure; an emitter system; and a detector system. Throughout the present disclosure, the inspection system may be referred to as a referencing system. The inspection system may comprise a radiation device comprising the emitter system and the detector system.

The inspection system may further comprise at least one reference object, wherein the reference object comprises a plurality of non-flat reference profiles. The reference object may be constituted by a reference block comprising a plurality of reference surfaces arranged as a palette. In this case, each reference surface may comprise one or more non-flat reference profiles.

Alternatively, or in addition, the at least one reference object may comprise a plurality of cylindrical or conical convex and concave surfaces, but also spherical convex and concave surfaces. Furthermore, the at least one reference surface may comprise at least one reference profile having a radius of curvature which is different in two perpendicular directions. Some or all of the reference profiles may be neither spherical nor cylindrical. By providing a high number of reference profiles including all relevant curvatures of the target object, reference measurements on target profiles of the target object can be dispensed with.

The inspection system may further comprise a reference object having a reference surface with an adjustable reference profile. The reference object may be configured to adjust a curvature of the reference profile in one or two directions. The adjustment of the reference profile may for example be realized by means of electrical and/or magnetic forces.

According to one example, a reference surface of a reference object constituted by a metal sheet material may adopt different reference profiles (e.g., curvatures) by applying mechanical forces. According to a further example, a reference surface of a reference object constituted by a piezoelectric actuator, such as a PZT (piezoelectric transducer), may adopt different reference profiles (e.g., become curved to different degrees) in the presence of an electric field. According to a further example, a reference surface of a reference object constituted by a ferrofluid may adopt different reference profiles in the presence of a magnetic field.

According to a further aspect, there is provided a manipulator system comprising a manipulator, such as an industrial robot, and an inspection system according to the present disclosure. In this case, the radiation device may be mounted to the manipulator, e.g., to a tool flange of an industrial robot.

BRIEF DESCRIPTION OF THE DRAWINGS

Further details, advantages and aspects of the present disclosure will become apparent from the following embodiments taken in conjunction with the drawings, wherein:

FIGS. 3a-3c: schematically represent reference measurements on three reference objects;

FIG. 4: schematically represents inspection measurement on a target object;

DETAILED DESCRIPTION

Figure 1:
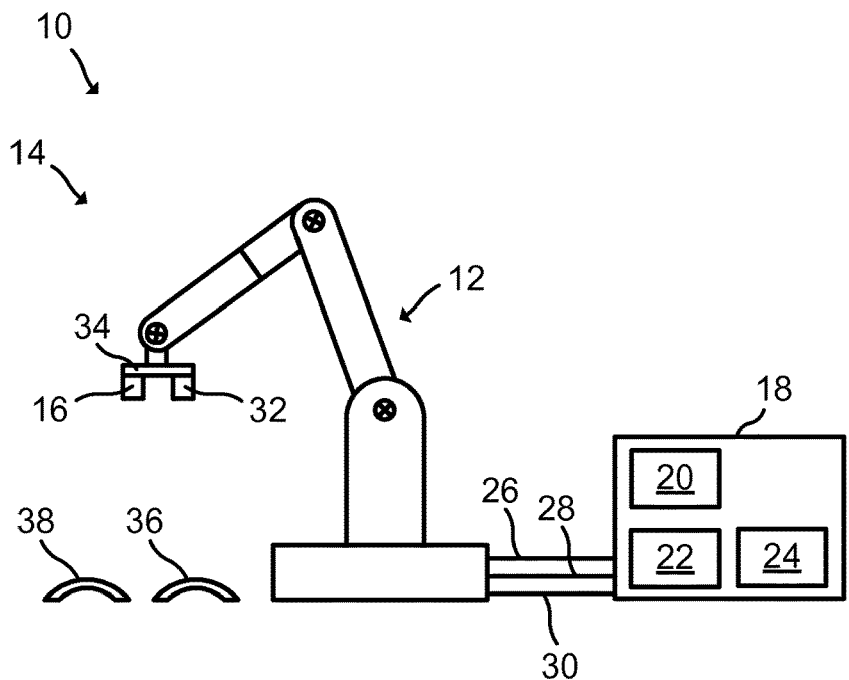
FIG. 1: schematically represents a manipulator system comprising a manipulator and an inspection system.

In the following, a method for inspection of a target object having a non-flat target profile by means of radiation, a control system for controlling an emitter system and a detector system, and an inspection system, will be described. The same reference numerals will be used to denote the same or similar structural features.

FIG. 1 schematically represents one example of a manipulator system 10 comprising a manipulator 12 and an inspection system 14. The inspection system 14 of this example comprises a radiation device 16 and a control system 18. The control system 18 comprises a light source 20, a data processing device 22 and a memory 24.

The memory 24 has a computer program stored thereon. The computer program may comprise program code which, when executed by the data processing device 22, causes the data processing to perform, and/or to command performance, of any step according to the present disclosure.

The inspection system 14 of this non-limiting example further comprises a first radiation guide cable 26, a second radiation guide cable 28 and an electric cable 30 connected between the control system 18 and the radiation device 16. The manipulator system 10 further comprises a profile sensor 32. In the example of FIG. 1, both the radiation device 16 and the profile sensor 32 are attached to a tool flange 34 of the manipulator 12.

The inspection system 14 further comprises a reference object 36. The reference object 36 comprises a reference surface having a non-flat reference profile (convex in FIG. 1) for a reference measurement. The reference measurement may be carried out prior to, or after, performing an inspection measurement on a target object 38 comprising a target surface with at least one non-flat target profile corresponding to the reference profile. As illustrated in FIG. 1, both the reference object 36 and the target object 38 have the same curvature. Reference measurements and inspection measurements will be described in more detail later.

The target surface of the target object 38 may comprise a wide range of different target profiles, e.g., curvatures. Some or all of the target profiles of the target object 38 may also be unknown. The profile sensor 32 is configured to determine the local profiles (e.g., curvature) of the target object 38 and/or the reference object 36, either alone or in combination with the radiation device 16. The profile sensor 32 may for example comprise three laser-distance sensors. Together with for example a THz time-domain measurement by means of the radiation device 16 that provides a fourth distance measurement, the radii of curvature of the target object 38 and/or the reference object 36 (in two perpendicular directions) can be determined.

The profile sensor 32 may comprise yet another distance sensor to determine the sign (i.e., convex or concave) of the curvature.

Figure 2:
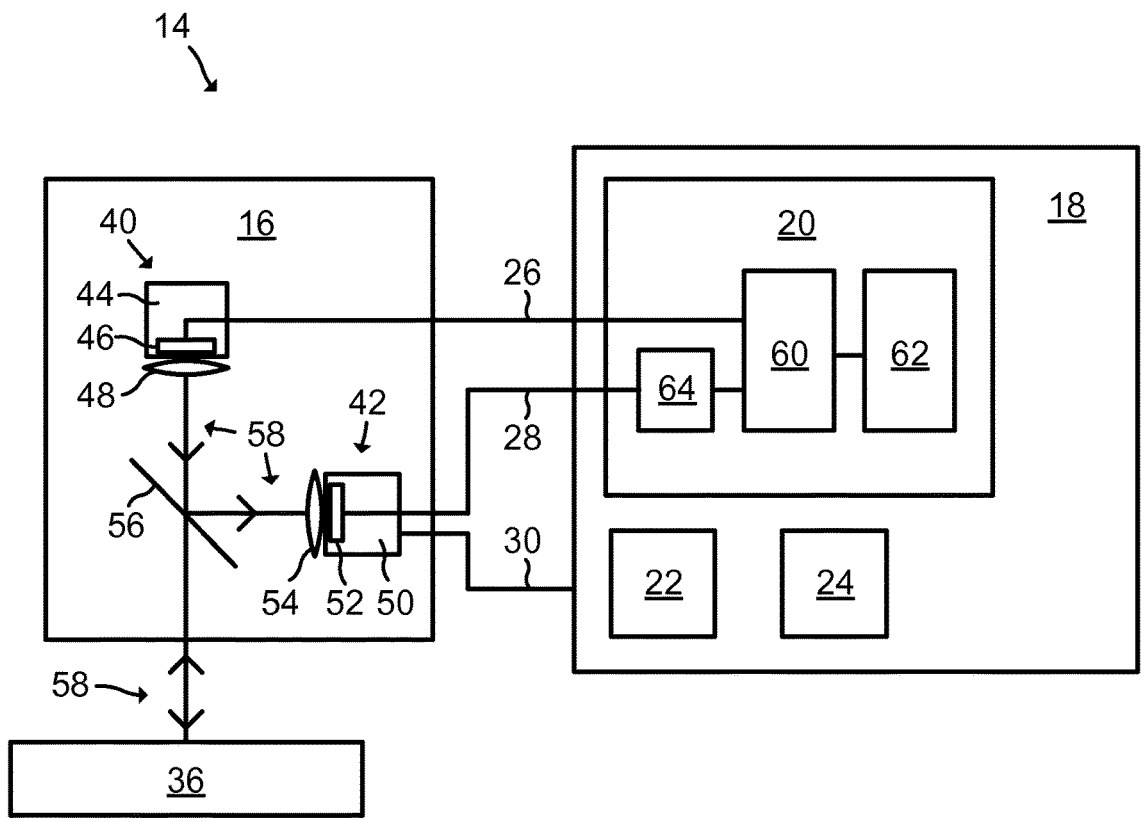
FIG. 2: schematically represents the inspection system of FIG. 1.

FIG. 2 schematically represents the inspection system 14 of FIG. 1. The inspection system 14 may for example be constituted by a THz inspection system, e.g., for emitting and detecting electromagnetic radiation 58 with a frequency of 0.01 THz to 10 THz, such as 0.1 THz to 3 THz.

The radiation device 16 of this example comprises an emitter system 40 and a detector system 42. The emitter system 40 comprises a radiation emitter 44, having a radiation generator 46, and an emitter optical system 48, here illustrated as a lens. The detector system 42 comprises a radiation detector 50, having a radiation receiver 52, and a detector optical system 54, here illustrated as a lens.

The radiation device 16 further comprises a beam splitter 56. The emitter system 40 and the detector system 42 are arranged with their axes at an angle (here: 90°), and the beam splitter 56 is arranged to co-align the axes, so that the emitted and received beams of radiation 58 are collinear and normal to the surface of the reference object 36 (or of the target object 38).

The light source 20 of this example comprises a main laser 60 fed by a pumping laser 62 (if necessary). The light source 20 is configured to generate a laser pulse, via the first radiation guide cable 26, capable of exciting the radiation 58 by impinging on the radiation generator 46 (e.g., a photoconductive antenna or a photonic crystal). The radiation generator 46 is thus configured to generate outgoing radiation 58, such as THz radiation, from light source radiation. The emitter optical system 48 is configured to direct the outgoing radiation 58 towards the reference object 36 (or towards a target object 38).

The radiation detector 50 is configured to detect incoming radiation 58 having interacted with the reference object 36 (or with a target object 38). The detector optical system 54 is configured to direct radiation having interacted with the reference object 36 (or with the target object 38) to the radiation receiver 52. The radiation receiver 52 is coupled to the light source 20 via the second radiation guide cable 28.

The light source 20 further comprises a light delaying unit 64, arranged between the main laser 60 and the detector system 42. The light delaying unit 64 is configured to delay light source radiation by a variable delay time so that the radiation receiver 52 receives delayed light source radiation from the light source 20.

Additional elements, not shown in FIG. 2, may be present as well, such as a pulse width shortener and other elements known to the person skilled in the art of non-contact optical inspection systems. The radiation 58 may be pulsed with pulse durations between 0.1 ps and 10 ps. The detection of the reflected (or transmitted) radiation 58 may be made in the time-domain and/or in the frequency-domain.

The control system 18 is operationally coupled, via the electric cable 30, to the radiation detector 50 for receiving and processing a detected response signal representing the detected radiation 58. The control system 18 may further be coupled to the radiation emitter 44 (e.g., via a further not illustrated electric cable) for controlling the radiation generator 46. The radiation generator 46 may for example be electrically manipulated by applying a bias voltage to it.

FIGS. 3a-3c schematically represent reference measurements on three reference objects 36a, 36b, 36c. Each reference object 36a, 36b, 36c comprises a reference surface 66a, 66b, 66c with a spherical reference profile 68a, 68b, 68c of unique curvature (reference objects, reference surfaces and reference profiles may also be referred to with reference numerals "36", "66" and "68", respectively). The reference profiles 68a, 68b, 68c may comprise a curvature with a radius of between 0.01 m and 20 m, such as between 0.1 m and 7 m, such as between 0.5 and 5 m.

As illustrated in FIGS. 3a-3c, an incoming beam of radiation 58 reflects differently in dependence of the reference profile 68a, 68b, 68c of the respective reference surface 66a, 66b, 66c. The divergence of the reflected beam of radiation 58 increases with a decreased radius of curvature of the reference profiles 68a, 68b, 68c. The divergence also increases for shorter wavelengths of the radiation 58.

FIG. 4 schematically represents an inspection measurement on a target object 38. The target object 38 may for example be constituted by a car body, a car bumper, an aircraft fuselage, or a part thereof.

The target object 38 comprises a target surface 70 having a spherical target profile 72. The target object 38 of this example further comprises a coating 74, such as a paint layer, applied on the target surface 70. In order to obtain absolute parameters of the target object 38, such as a thickness of the coating 74 of the target object 38, a reference measurement is required.

The target surface 70 may be a curved aluminum surface and the coating 74 may be a paint layer with a thickness of approximately 30 μm. One or several layers of coating 74 may be provided on the target surface 70 and at least one parameter of one, several or all of the layers may be determined by means of the method according to the present disclosure. Examples of coatings 74 on the target surface 70 include an e-coat layer, a primer layer, a base coat layer, a clear coat layer, or any combination thereof. The method according to the present disclosure may however also be carried out on target objects 38 without any coating 74.

The curved target profile 72 of the target surface 70 creates a different reflected beam size and beam profile of the radiation 58 at the radiation detector 50, in comparison with a flat target surface. Reflected radiation 58 with a similar beam size and beam profile can however be generated by irradiating a reference surface 66 having a reference profile 68 with the same or similar curvature as the target profile 72. Among the reference surfaces 66a, 66b, 66c, in FIGS. 3a-3c, the reference profile 68b of the reference surface 66b in FIG. 3b is most comparable to the target profile 72 of the target surface 70. By determining at least one parameter of the target object 38 based on inspection response data from the curved target surface 70 and based on reference response data from the similarly curved reference surface 66b, a compensation is provided that eliminates or reduces effects associated with changes of the reflected beam of radiation 58 related to the curvature of the target surface 70.

Each reference surface 66a, 66b, 66c may comprise a material that reflects close to 100% of the incoming light (e.g., aluminum). Alternatively, or in addition, each reference surface 66a, 66b, 66c may be constituted by a surface that mimics well the target surface 70 below the coating 74. For example, in case of quality inspection of a car body, the target surface 70 may be constituted by a zinc layer underneath one or more paint layers. Such zinc layer is metallic, and in principle thus highly reflecting, but due to the chemical process very rough, and therefore optically substantially different as compared to a shiny mirror surface.

Figure 5:
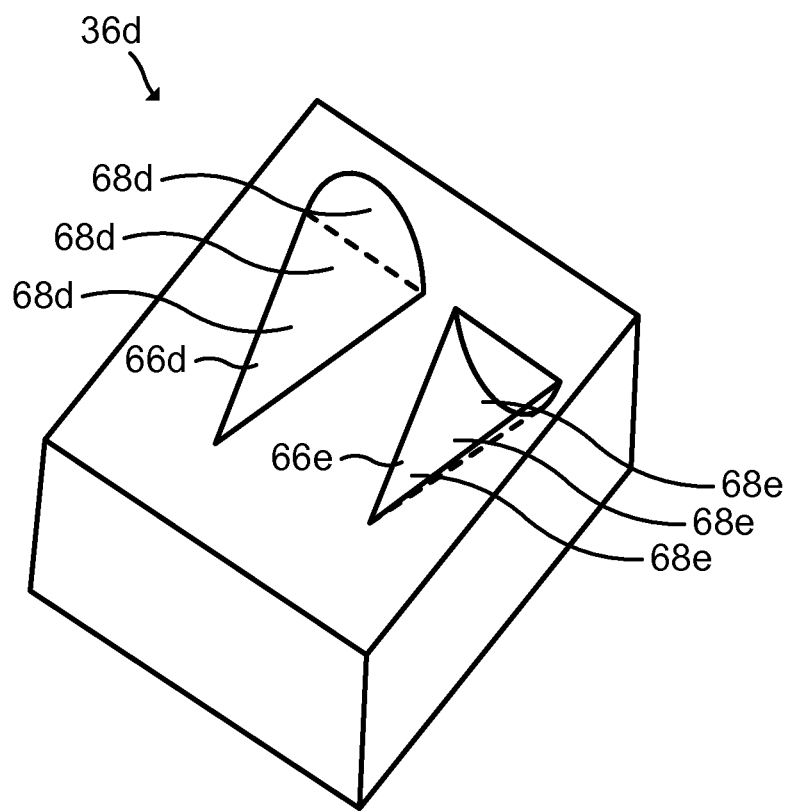
FIG. 5: schematically represents a perspective view of a further reference object.

FIG. 5 schematically represents a perspective view of a further reference object 36d, for example made of metal. The reference object 36d comprises a plurality of non-flat reference profiles 68d, 68e. More specifically, the reference object 36d comprises two reference surfaces 66d, 66e constituted by a convex and a concave half cone, respectively, where the radii of curvature change along the respective axes of the cones. Alternative reference surfaces according to the present disclosure may for example be constituted by reference surfaces having different radii of curvature in two perpendicular directions (e.g., horizontal and vertical), such as cylindrical concave, cylindrical convex, ellipsoids and surfaces with saddle points.

With collective reference to FIGS. 1-5, one non-limiting example of a method for inspection of a target object 38 according to the present disclosure will be described. Prior to inspection, a series of reference measurements is carried out on a plurality of reference profiles 68, either on a single reference surface 66, or on different reference surfaces 66. This may be done by manually displacing either the radiation device 16 or the reference object 36. Alternatively, this may be done in an automatized manner by scanning with the radiation device 16 across one or more reference surfaces 66, for example under the control of the manipulator 12.

Each reference measurement comprises irradiation of a reference surface 66 with radiation 58 and determining reference response data, associated with the current reference profile 68, based on detected radiation 58 having interacted with the reference surface 66. The reference response data may for example be constituted by, or comprise, a reference response waveform (in time-domain), a reference response spectrum (in frequency-domain), and/or some other signal sequence describing the detected radiation 58 reflected from the reference surface 66.

The reference object 36 may comprise a plurality of different reference profiles 68, such as a range of different curvatures, that constitute a representative subset of the target object 38 to be inspected. The reference profiles 68 may for example be determined by means of the profile sensor 32, or may be previously known.

Automatic reference measurements across hundreds of different reference profiles 68 (e.g., differently curved locations) can be made rather fast. Thereby, downtime of a quality control process can be avoided. A typical THz radiation device may have a repetition rate of 5-30 Hz. The time to perform for example 50 reference measurements may therefore be less than ten seconds. In the automotive industry for instance, this may be precisely the time in between two car bodies.

After this series of reference measurements, one or more inspection measurements are carried out on the target object 38 with the radiation device 16. By means of the profile sensor 32, one or more target profiles 72 of the target object 38, such as the local radii thereof, can be determined.

Alternatively, the target profiles 72 may be previously known, or determined differently.

Each inspection measurement comprises irradiation of the target object 38 with radiation 58 and determining inspection response data based on detected radiation 58 having interacted with the target object 38. The inspection response data may for example be constituted by, or comprise, an inspection response waveform (in time-domain), an inspection response spectrum (in frequency-domain), and/or some other signal sequence describing the detected radiation 58 reflected from the target object 38.

At least one parameter of the target object 38 may then be determined by means of an algorithm based on a physical model. According to one example, the at least one parameter of the target object 38 is determined by fitting a simulated or predicted response signal (constituting simulated or predicted response data) of the physical model to a detected response signal (constituting inspection response data) by an iterative procedure comprising the steps:

(a) calculating a predicted response signal based on the physical model using an initial guess for model parameters of the physical model;

(b) calculating an error function expressing a deviation between the predicted response signal and the detected response signal;

(c) iterating steps (a) and (b), wherein the model parameters are varied until the error function satisfies a best-fit criterion; and (d) obtaining the fitted parameters as the final parameters satisfying the best-fit criterion in step (c), and calculating at least one parameter of the target object 38 from the fitted parameters, wherein the physical model comprises a reference response signal (constituting reference response data) as an input variable.

The reference response signal constitutes the reference response data from a reference measurement of a reference profile 68 which is most comparable to the target profile 72, e.g., from a location on the reference object 36 that has the same or most comparable radii of curvature as the target profile 72 of the target object 38.

By using a reference measurement on a reference object 36 with a similar radius of curvature as the target object 38, the match between the predicted response data and the inspection response data can be substantially increased using the algorithm. This results in an enhanced accuracy of the determination of one or more parameters of the target object 38, such as material parameters and the thickness of the coating 74. In the example in FIG. 4 of a target object 38 comprising a coating 74 constituted by a paint layer with a thickness of approximately 30 μm on a curved aluminum surface, the deduced thickness improves with at least 1.3 μm by using a curved reference surface 66 with the same curvature as the target surface 70, instead of a flat reference surface.

In the above example, the reference surfaces 66 are provided on one or more reference objects 36. However, the reference surface 66 may alternatively be constituted by the target surface 70, e.g., before the coating 74 is applied.

Figure 6A:
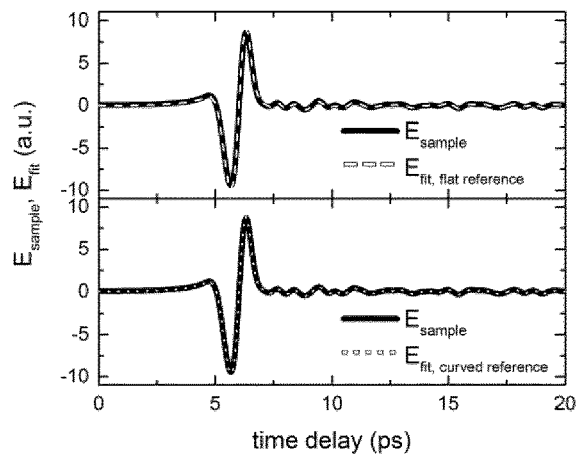
FIGS. 6a-6c: show various graphs of detected response.
Figure 6B:
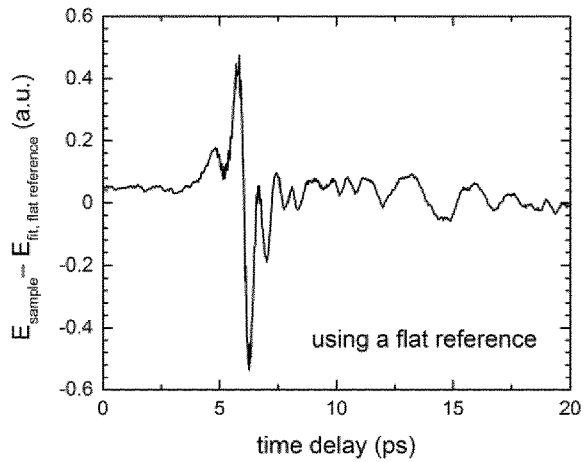
Figure 6C:
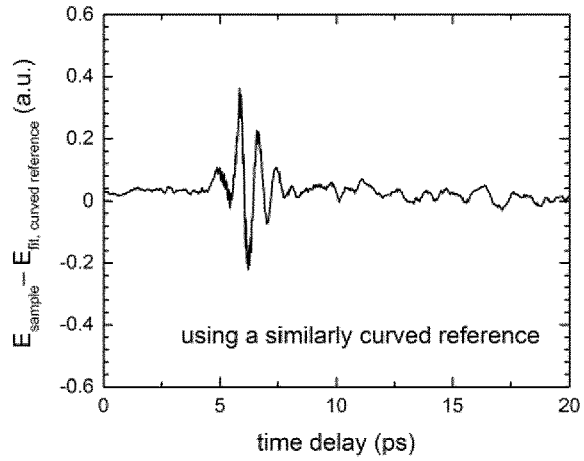

FIGS. 6a-6c show graphs of acquired response signals expressed as electric fields at THz frequencies. The graphs illustrate the principle of the method according to the present disclosure exemplified for a coating 74 constituted by a paint layer on a target surface 70 constituted by an aluminum surface which is spherically curved with radii R=500 mm. The upper graph in FIG. 6a shows the acquired reflected electric field $E_{sample}$ from the sample (target object 38), and a best-fit result $E_{fit, \text{ flat reference}}$ using a flat reference surface constituted by an aluminum surface. The lower graph in FIG. 6a shows the acquired reflected electric field from the sample $E_{sample}$, and a best-fit result $E_{fit, \text{ curved reference}}$ using a reference surface 66 constituted by a spherically curved aluminum reference with R=500 mm. The graph in FIG. 6b shows the difference between $E_{sample}$ and $E_{fit, \text{ flat reference}}$. The graph in FIG. 6c shows the difference between $E_{sample}$ and $E_{fit, \text{ curved reference}}$.

Figure 7A:
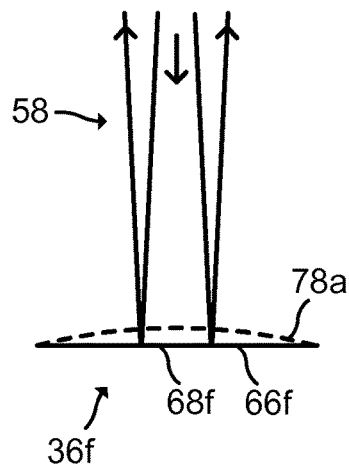
FIGS. 7a-7c: schematically represent reference measurements out of focus on a further reference object.
Figure 7B:
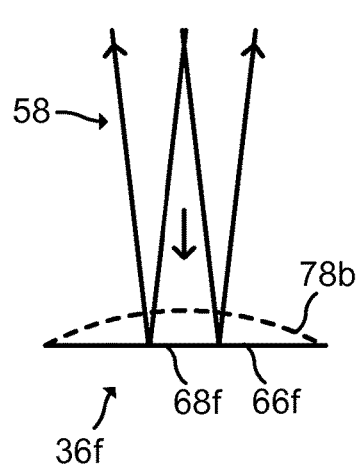
Figure 7C:
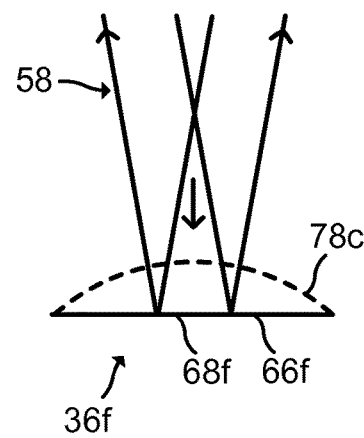

FIGS. 7a-7c schematically represent three different reference measurements on a further reference object 36f. Mainly differences with respect to FIGS. 1-6 will be described. In the example in FIGS. 7a-7c, each reference measurement is made out of focus. Furthermore, in the examples in FIGS. 7a-7c, the reference object 36f is flat. That is, the reference object 36f comprises a reference surface 66f having a flat reference profile 68f. However, reference measurements out of focus according to the present disclosure may also be carried out on reference surfaces having non-flat reference profiles.

The same effect as performing a reference measurement on a reference surface having a spherical reference profile can be obtained by performing a reference measurement out of focus on the reference surface 66f having a flat reference profile 68f. Furthermore, the same effect as performing a reference measurement on a reference surface having a reference profile with different curvature in two perpendicular directions (e.g., horizontal and vertical) can be obtained by performing a reference measurement out of focus on a reference surface having a cylindrical reference profile.

As shown in FIG. 7a, by performing a reference measurement out of focus on the reference object 36f having a flat reference profile 68f, the same effect as performing a reference measurement on a spherical theoretical reference profile 78a can be obtained. As shown in FIGS. 7b and 7c, by performing measurements further out of focus on the reference object 36f having a flat reference profile 68f, the same effect as performing reference measurements on spherical theoretical reference profiles 78b, 78c, with further smaller radii of curvature, can be obtained (theoretical reference profiles may also be referred to with reference numeral "78"). That is, the more the incoming beam of radiation 58 is out of focus, the smaller radius of curvature of the respective theoretical reference profile 78b, 78c the reflected beam of radiation 58 corresponds to.

Each theoretical reference profile 78a, 78b, 78c may comprise a curvature with a radius of 0.01 m to 20 m, such as 0.1 m to 7 m, such as 0.5 to 5 m. The theoretical reference profiles 78a, 78b, 78c may for example correspond to the reference profiles 68a, 68b, 68c, respectively, in FIGS. 3a-3c.

According to an alternative variant of inspection of the target object 38, the method comprises irradiating the reference surface 66*f* with radiation 58, and detecting radiation 58 having interacted with the reference surface 66*f*, where the irradiation and/or the detection of the radiation 58 is made out of focus. The method of this alternative variant further comprises determining reference response data associated with one or more theoretical reference profiles 78*a*, 78*b*, 78*c*, based on detected radiation 58 from the reference surface 66*f*. Reference response data associated with a non-flat theoretical reference profile 78 corresponding to a non-flat target profile 72, and determined in this way, may then be used as an input variable to the physical model as described above in order to determine at least one parameter of the target object 38.

Figure 8A:
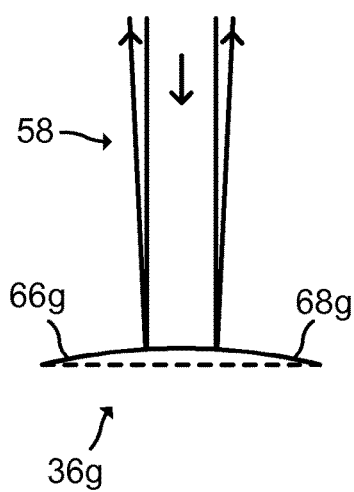
FIGS. 8a-8c: schematically represent reference measurements on a further reference object having a reference surface with an adjustable reference profile.
Figure 8B:
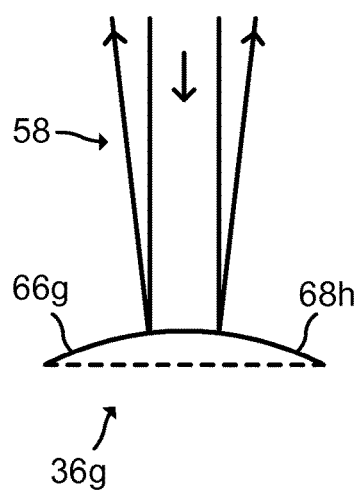
Figure 8C:
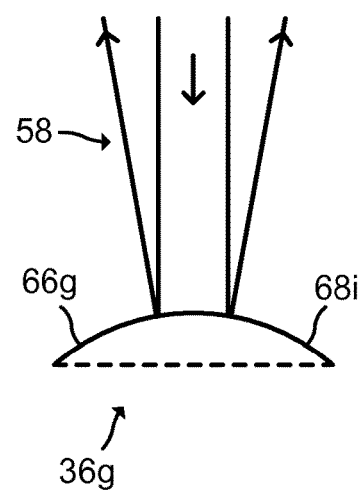

FIGS. 8*a*-8*c* schematically represent three reference measurements on a further reference object 36*g*. Mainly differences with respect to FIGS. 1-7 will be described.

The reference object 36*g* in FIGS. 8*a*-8*c* comprises an adjustable reference surface 66*g*. As shown in FIGS. 8*a*-8*c*, the reference surface 66*g* can change its shape into different spherical reference profiles 68*g*, 68*h*, 68*i*, for example corresponding to the reference profiles 68*a*, 68*b*, 68*c*, respectively, in FIGS. 3*a*-3*c*. The reference object 36*g* may for example be constituted by a metal sheet material that adopts the different reference profiles 68*g*, 68*h*, 68*i* by applying mechanical forces.

The reference object 36*g* may alternatively be constituted by a piezoelectric actuator, such as a PZT (piezoelectric transducer), that adopts the different reference profiles 68*g*, 68*h*, 68*i* in the presence of an electric field, or be constituted by a ferrofluid that adopts the different reference profiles 68*g*, 68*h*, 68*i* in the presence of a magnetic field.

When the reference surface 66*g* of the reference object 36*g* has adopted a particular reference profile 68*g*, 68*h*, 68*i*, a reference measurement is carried out on the reference surface 66*g* and reference response data, associated with the current reference profile 68*g*, 68*h*, 68*i*, is determined. Reference response data associated with the reference profile 68*g*, 68*h*, 68*i* that corresponds to a non-flat target profile 72 may then be used as an input variable to the physical model as described above in order to determine at least one parameter of the target object 38.

While the present disclosure has been described with reference to exemplary embodiments, it will be appreciated that the present invention is not limited to what has been described above. For example, it will be appreciated that the dimensions of the parts may be varied as needed.

The invention claimed is:

1. A method for inspection of a target object, the method comprising:
irradiating a plurality of non-flat reference profiles of one or more reference surfaces with radiation;
for each reference profile, determining reference response data associated with the reference profile, based on detected radiation having interacted with the reference surface;
irradiating a target object with radiation, the target object comprising a target surface having a non-flat target profile corresponding to the reference profile;
determining inspection response data based on detected radiation having interacted with the target object;
determining the target profile of the target surface;
selecting the reference profile most comparable to the target profile; and
determining at least one parameter of the target object based on the reference response data and the inspection response data;
wherein the determination of at least one parameter of the target object is made based on the reference response data associated with the selected reference profile and the inspection response data.

2. The method according to claim 1, wherein the reference profile comprises a curvature with a radius of 0.01 m to 20 m, such as 0.1 m to 7 m, such as 0.5 m to 5 m.

3. The method according to claim 2, wherein the reference surface is constituted by the target surface.

4. The method according to claim 2, wherein the reference surface is provided on a reference object.

5. The method according to claim 1, wherein the reference surface is constituted by the target surface.

6. The method according to claim 1, wherein the reference surface is provided on a reference object.

7. The method according to claim 1, wherein the target object includes at least one coating on the target surface; and wherein the determination of at least one parameter of the target object comprises determining at least one parameter of the at least one coating.

8. The method according to claim 7, wherein the determination of at least one parameter of the at least one coating comprises determining a thickness of the at least one coating and/or optical properties of the at least one coating.

9. The method according to claim 1, wherein the radiation is electromagnetic radiation with a frequency of 0.01 THz to 10 THz, such as 0.1 THz to 3 THz.

10. A method for inspection of a target object, the method comprising:
irradiating a reference surface having a reference profile with radiation;
detecting radiation having interacted with the reference surface, wherein the irradiation and/or the detection of the radiation is made out of focus;
determining reference response data associated with a non-flat theoretical reference profile, based on the detected radiation;
irradiating a target object with radiation, the target object comprising a target surface having a non-flat target profile corresponding to the theoretical reference profile;
determining inspection response data based on detected radiation having interacted with the target object; and
determining at least one parameter of the target object based on the reference response data and the inspection response data.

11. The method according to claim 10, wherein the theoretical reference profile includes a curvature with a radius of 0.01 m to 20 m, such as 0.1 m to 7 m, such as 0.5 m to 5 m.

12. The method according to claim 11, wherein the reference surface is provided on a reference object.

13. The method according to claim 10, wherein the reference surface is provided on a reference object.

14. A control system for controlling an emitter system and a detector system, the control system including a data processing device and a memory having a computer program stored thereon, the computer program including a program code which, when executed by the data processing device, causes the data processing device to perform the steps of:
controlling the emitter system to irradiate a plurality of non-flat reference profiles of one or more reference surfaces with radiation;

controlling the detector system to detect radiation;
for each reference profile, determining reference response data associated with the reference profile, based on detected radiation having interacted with the reference surface;
controlling the emitter system to irradiate a target object with radiation, the target object comprising a target surface having a non-flat target profile corresponding to the reference profile;
determining inspection response data based on detected radiation having interacted with the target object;
determining the target profile of the target surface;
selecting the reference profile most comparable to the target profile; and
determining at least one parameter of the target object based on the reference response data and the inspection response data;
wherein the determination of at least one parameter of the target object is made based on the reference response data associated with the selected reference profile and the inspection response data.

15. An inspection system comprising:
the control system of claim 14;
an emitter system; and
a detector system.

16. The inspection system according to claim 15, further comprising at least one reference object, wherein the reference object includes a plurality of non-flat reference profiles.

17. The inspection system according to claim 16, further comprising a reference object having a reference surface, wherein the reference object is configured to adjust a curvature of the reference profile in one or two directions.

18. The inspection system according to claim 15, further comprising a reference object having a reference surface, wherein the reference object is configured to adjust a curvature of the reference profile in one or two directions.

19. A control system for controlling an emitter system and a detector system, the control system including a data processing device and a memory having a computer program stored thereon, the computer program including a program code which, when executed by the data processing device, causes the data processing device to perform the steps of:
controlling the emitter system to irradiate a reference surface having a reference profile with radiation;
controlling the detector system to detect radiation having interacted with the reference surface, wherein the irradiation and/or the detection of the radiation is made out of focus;
determining reference response data associated with a non-flat theoretical reference profile, based on the detected radiation;
controlling the emitter system to irradiate a target object with radiation, the target object comprising a target surface having a non-flat target profile corresponding to the theoretical reference profile;
determining inspection response data based on detected radiation having interacted with the target object; and
determining at least one parameter of the target object based on the reference response data and the inspection response data.

20. An inspection system comprising the control system of claim 19, an emitter system, and a detector system.

* * * * *